Aug. 28, 1951   E. LAXO ET AL   2,566,217
CLUTCH AND BRAKE MECHANISM FOR PRESSES
Filed Nov. 5, 1947   3 Sheets-Sheet 1
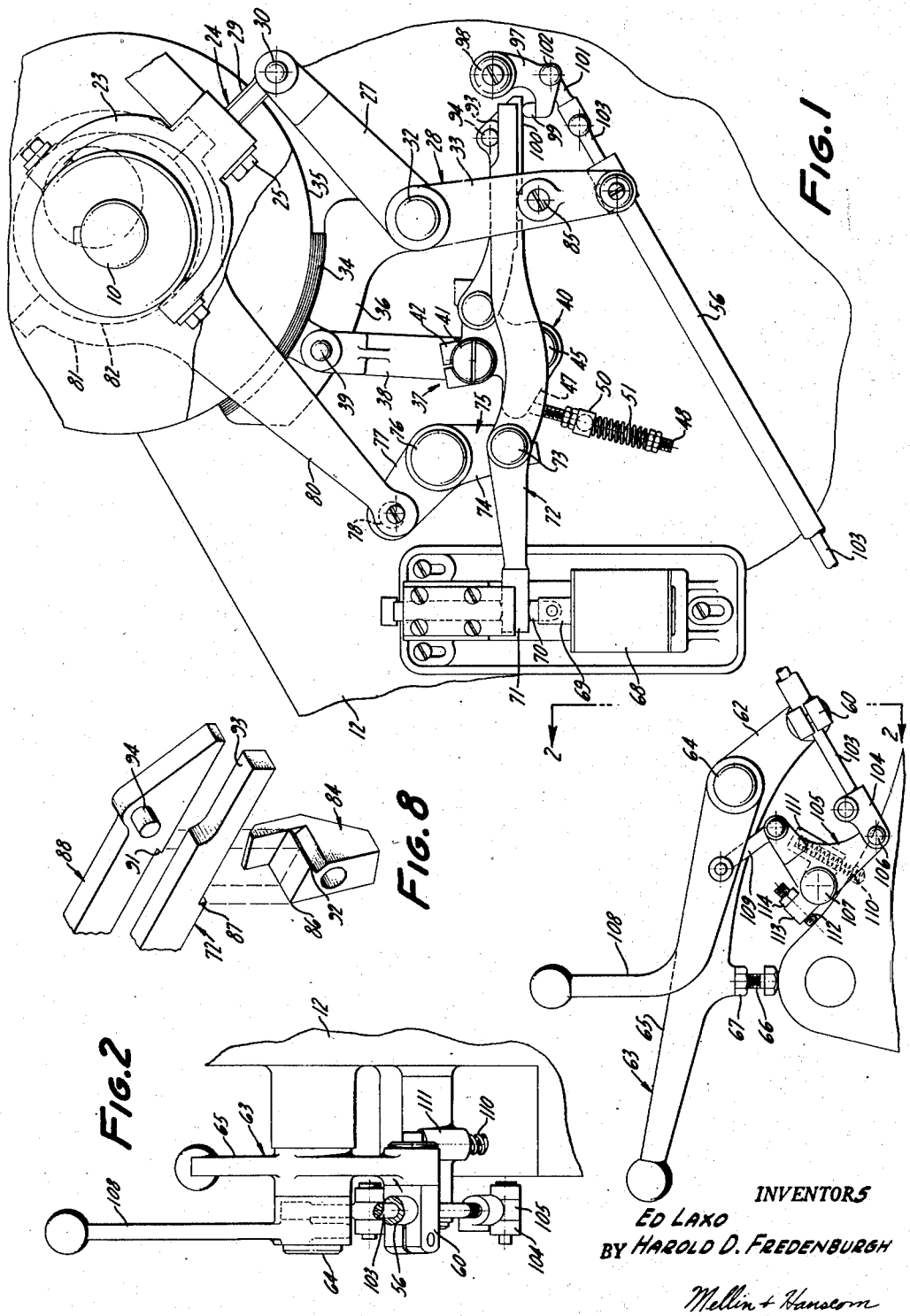
INVENTORS
ED LAXO
BY HAROLD D. FREDENBURGH
Mellin + Hanscom
ATTORNEYS Aug. 28, 1951     E. LAXO ET AL     2,566,217
CLUTCH AND BRAKE MECHANISM FOR PRESSES
Filed Nov. 5, 1947     3 Sheets-Sheet 2

INVENTORS
ED LAXO
HAROLD D. FREDENBURGH
BY
Mellin + Hanscom
ATTORNEYS

Aug. 28, 1951                E. LAXO ET AL                2,566,217
              CLUTCH AND BRAKE MECHANISM FOR PRESSES
Filed Nov. 5, 1947                                3 Sheets-Sheet 3

INVENTORS
ED LAXO
HAROLD D. FREDENBURGH
BY

Mellin + Hanson
ATTORNEYS

Patented Aug. 28, 1951

2,566,217

UNITED STATES PATENT OFFICE 2,566,217

CLUTCH AND BRAKE MECHANISM FOR PRESSES

Ed Laxo and Harold D. Fredenburgh, Oakland, Calif., assignors to Atlas Imperial Diesel Engine Co., Oakland, Calif., a corporation of Delaware Application November 5, 1947, Serial No. 784,230

5 Claims. (Cl. 192—.072)

This invention relates to clutch and brake mechanisms, and more particularly to such mechanisms for starting and stopping a stamping press or the like.

In presses for stamping articles from relatively light metal at very high speeds, such as presses for producing the ends of tin cans, output has been limited by the inability to design a clutch mechanism capable of withstanding continuous operation at high starting speeds. One form of prior clutch mechanisms includes a flywheel having a pin capable of striking a lug on the press crankshaft, to rotate the latter with the flywheel and effect reciprocation of an associated press crosshead and punches with respect to co-operative dies. The pin strikes the lug at full operating speed, accelerating the crosshead to maximum velocity almost instantaneously and imposing such exorbitant impact and shearing stresses on the pin as to produce its failure after a relatively short period of operation.

It is, accordingly, an object of the present invention to provide a press clutch mechanism which is subjected to a minimum starting load upon engagement of the clutch elements. More specifically, the invention contemplates the use of a friction clutch for effecting a driving connection between the press flywheel or pulley and its crankshaft, and so controlling the positions of rest of the driven parts as to subject the friction clutch elements to a minimum starting load upon their engagement.

Another object of the invention is to provide an improved clutch and brake mechanism, which is readily adjustable to insure stopping and starting of the driven elements at a predetermined point in their operating cycle.

In its general aspects, the invention contemplates the releasing of a clutch and the stopping of the press with its crosshead at a selected point, namely, top dead center. This point is chosen, so that upon re-engaging the clutch to perform the stamping cycle, only a minimum starting load is imposed on the clutch, with the maximum velocity of the crosshead being obtained prior to the cutting and drawing operation in the dies. Although specific reference is made herein to a stamping and similar press, the clutch and brake mechanism has a more general application, as will appear from the description.

One form which the invention may assume is exemplified in the following description and illustrated by way of example in the accompanying drawings, in which:

Fig. 1 is an end elevation of part of a sheet metal stamping press, disclosing the clutch and brake mechanism.

Fig. 2 is a section taken along the line 2—2 on Fig. 1.

Fig. 8 is a fragmentary, exploded view of the clutch and brake bar and their cooperation with the block attached to the clutch control lever.

Figure 4:
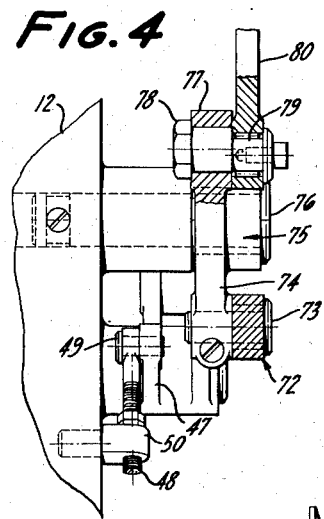
Fig. 4 is a front elevation, with parts in section, of part of the clutching and braking mechanism.

The clutch and brake mechanism is shown as applied to a stamping press, which may be designed for punching and forming the ends of sanitary tin cans. In such press, a crankshaft 10 is rotatably mounted in bearings 11 at the upper end of the press frame 12, there being a connecting rod 13 mounted on the crank pin 14 of the crankshaft, whose other end is connected to the crosshead 15 reciprocable in the frame guideways 16 and carrying suitable punches 17 at its lower end for stamping out and forming the tin can ends in cooperation with the usual press dies 18. The crankshaft 10 is rotatable during the stamping and forming cycle of the press by a driving pulley or flywheel 19 rotatably mounted thereon and connectable thereto by a suitable clutch 20, preferably of the friction type.

The driven element 21 of this clutch may be engaged and disengaged with the driving clutch element secured to the drive pulley 19 through suitable manipulations of a clutch collar 22 lengthwise of the crankshaft. Such movement may be imparted to the clutch collar through a usual forked yoke 23 connected to the collar to permit rotation of the latter, the yoke constituting the upper arm of a bellcrank lever 24, pivotally mounted on a stud 25 secured to a stationary part, such as the frame 12 of the machine, with the other bellcrank arm 26 connected to the upper arm 27 of a clutch operating lever mechanism 28 through the intermediary of a link 29 and associated pin connecting elements 30. The clutch operating lever 28 has an extended hub 31 mounted on a suitable post or fulcrum pin 32 secured to and projecting from the frame 12 of the press, the lever also having a lower arm 33 integral with the hub whose manipulations determine the engagement and disengagement of the friction clutch 20, in order to drivably connect or disconnect the driving pulley 19 with respect to the crankshaft 10.

The crankshaft 10 can be arrested and brought to a stop in a predetermined position through engagement of a brake shoe 34 with the periphery of a brake drum 35 secured to the crankshaft. This brake shoe is affixed to an arm 36 which may be pivotally mounted on the same post or fulcrum pin 32 as the hub 31 of the clutch operating lever 28. The brake shoe is applied to the drum 35 by a spring force acting through a toggle lever mechanism 37.

Figure 5:
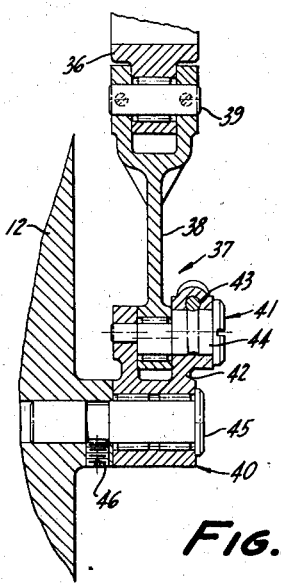
Fig. 5 is a section through part of the toggle brake applying elements.
Figure 3:
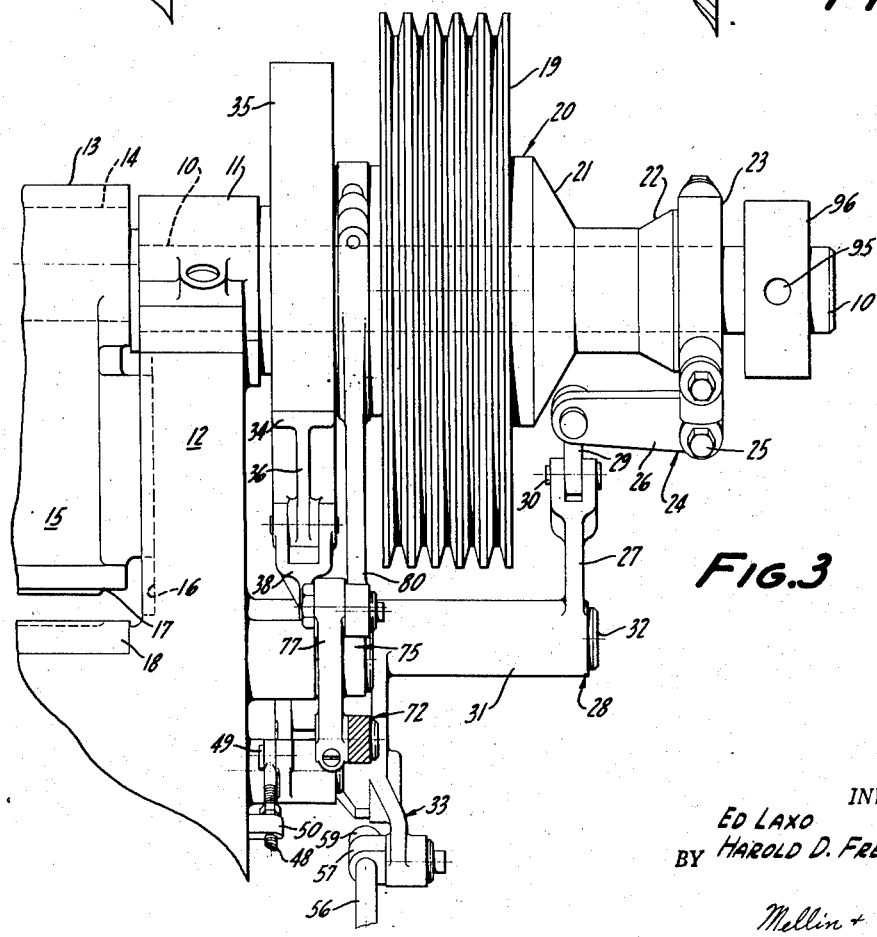
Fig. 3 is a front elevation of part of the press shown in Fig. 1.
Figure 6:
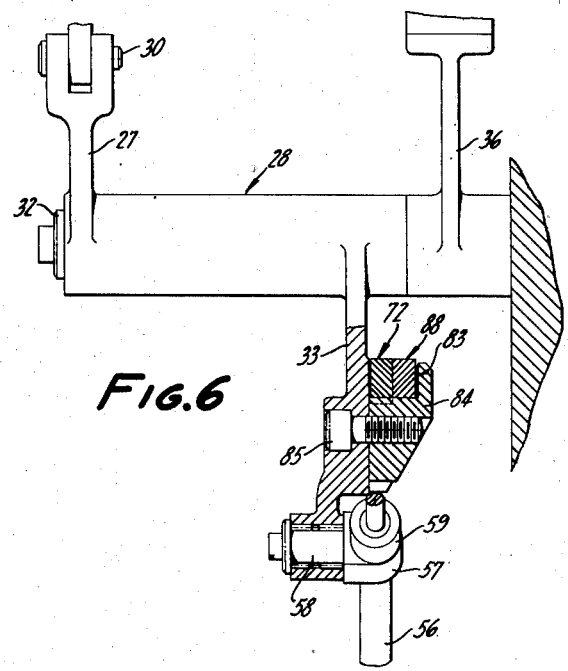
Fig. 6 is a rear elevation, with parts in section, of the clutch control and brake shoe device, as seen from the right of Fig. 1.

As specifically shown in the drawing, the toggle lever device 37 includes an upper link 38 connected to the brake arm 36 by a pin 39, the lower end of such link being pivotally secured to the lower lever 40 of the toggle lever mechanism by a pin 41, which is clamped to an arm 42 of the lower lever by a suitable screw 43, the pin 41 having an eccentric 44 receiving the lower end of the upper link 38 (see Fig. 5). The lever 40 is pivotally mounted on a stud 45 secured to the press frame 12 by a set screw 46 or the like, and such lever also has an arm 47 to which the upper end of a threaded rod 48 is pivotally secured by being mounted on a stud 49 projecting from the arm. The threaded rod extends through a swivel block 50 oscillatably mounted in the press frame 12, there being a helical compression spring 51 disposed around the lower end of the threaded rod and bearing at one end against the swivel block 50 and at the other end upon an adjusting nut 52 threaded on the rod, such nut being locked in position on the rod or member by a lock nut 53. The extent of lowering movement of the rod 48 within the swivel block 50, in moving the brake shoe to releasing position, is limited by engagement of a stop nut 54 on the rod with the other side of the swivel block, such nut being locked in position on the threaded rod by a lock nut 55.

Figure 7:
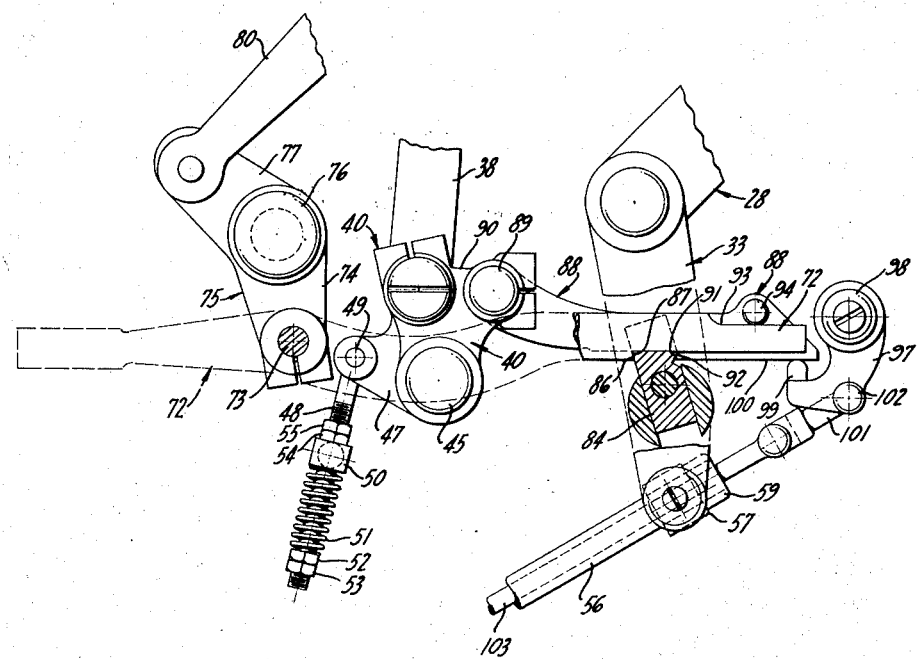
Fig. 7 is an end elevation with parts broken away, of the clutch and brake control mechanism.

It is evident that rocking of the lower lever 40 on its fulcrum pin or stud 45 in one direction, as in the clockwise direction as disclosed in Figs. 1 and 7, will engage the brake shoe 34 with the brake drum 35 and arrest movement of the crankshaft 10, whereas the spring 51 is tending to move the parts in a reverse direction, in order to effect release of the brake shoe from the drum. Engagement of the brake shoe 34 is determined by the mechanism for releasing the clutch 20, whereas its disengagement is effected automatically upon shifting of the clutch to engaged position, or may be performed at will through movement of suitable control instrumentalities to be described hereafter.

The clutch operating mechanism includes a tubular shifter rod 56, whose upper end extends slidably through a trunnion block 57 having a pin 58 secured thereto pivotally mounted in the lower end of the lower clutch operating lever arm 33. The tubular shifter rod 56 has a stop collar 59 secured to its upper end adapted to engage the upper end of the trunnion block 57. The lower end of the tubular rod is clamped within a trunnion block 60 whose pin 61 is pivotally mounted within one arm 62 of a shipper lever 63 oscillatably mounted upon a stud 64 secured to the frame 12 of the press. The other arm 65 of the shipper lever is adapted to be grasped by the hand of the operator, in order to effect engagement of the clutch 20 through elevating the arm 65, its lowering movement being limited by engagement of a stop screw 66 threaded therein against a stationary part of the machine frame. This screw is adjustable within the shipper lever, being held in adjusted position by a suitable lock nut 67 threaded thereon and adapted to bear against the lever 63.

Upon elevating the free end 65 of the shipper lever 63, the latter will be moved in a clockwise direction (as seen in Fig. 1), shifting the tubular rod 56 downwardly and rocking the clutch operating lever mechanism 28 in a clockwise direction to engage the clutch 20, and, therefore, effect a driving connection between the driving pulley 19 and the crankshaft 10. Following such engagement, the shipper lever 63 may be released and it will drop to its initial position as determined by its stop screw 66 resting upon the machine frame. This releasing movement elevates the stop collar 59 away from the trunnion block 57 pivotally secured to the lower arm 33 of the clutch operating lever 28, to prevent its interference with the movement of the clutch operating lever 28 in a counterclockwise direction (as seen in Fig. 1) to clutch releasing position.

The clutch will remain in engagement so long as it is desired to operate the press. It is, however, released or disengaged by an electrically actuated trip mechanism, illustrated in the drawing as a solenoid 68, in dependence upon the current passing therethrough. The passage of current may be determined by a conventional switch (not shown) at the will of the operator, or by means of other automatic devices installed at suitable points for stopping the press in the event of a jam between punch and die, or in the event of more than two sheets of tin being fed between the punch and die simultaneously. The solenoid has a plunger 69 adapted to be drawn downwardly within the solenoid coil 68 upon passage of current therethrough. This plunger has a notch or slot 70 receiving the end 71 of a latch bar 72, which is pivotally mounted upon a pin 73 clamped within the lower arm 74 of a rocker lever 75 fulcrumed upon a stud 76 secured to the press frame 12, the other arm 77 of the rocker lever carrying a pin 78 having an eccentric portion 79 (see Fig. 4) on which the lower end of a connecting rod 80 is pivotally mounted, the other end of the rod being formed as an eccentric strap 81 encompassing an eccentric 82 secured on the crankshaft 10 of the press. This eccentric is preferably adjustable in order to vary its throw and the extent of reciprocation of the connecting rod 80 and the oscillation of the rocker member 75.

The latch bar 72 extends toward the clutch operating lever 28 from the pivot pin 73 on the rocker arm 75 through a groove 83 defined between the lower arm 33 of the clutch operating lever and a latch block 84 secured to the arm 33 by a cap screw 85. This block has a corner 86 on its forward face at the base of the groove 83 adapted to be engaged by the companion corner 87 of a lower notch on the latch bar, in order to effect release of the clutch 20 in dependence upon the interruption of the flow current through the solenoid 68.

The latch bar 72 also is instrumental in applying the brake shoe 34 at a predetermined point in the cycle of operation of the press. Such operation is effected by pivotally mounting one end of a brake latch bar 88 on a pin 89 clamped to an arm 90 of the lower toggle lever 40, the brake latch bar 88 extending adjacent and parallel to the clutch latch bar 72 and having a corner 91 adapted to engage a corner 92 adjacent the base of the latch block groove 83 located on the other side of the block 84 from the corner 86 engageable by the clutch operating latch bar 72. The brake latch bar can be held in an elevated position by the clutch latch bar, the upper surface 93 of the rearward end of the latter being recessed for engagement with a pin 94 secured to the brake latch bar 88, in order to swing such bar about its pivot pin 89 on the toggle lever 40 and maintain its corner 91 free from engagement with the corner 92 of the latch block, thereby preventing actuation of the toggle lever device and application of the brake shoe 34, until desired.

The clutch latch bar 72 is normally maintained by the solenoid 68 in such position as to hold its corner 87 above its companion corner 86 on the latch block 84, to prevent operation of the clutch operating lever 28 by the latch bar. So long as the machine is operating and current is passing through the solenoid 68, the plunger 69 is held in a downward position, which holds the outer arm of the bar 72 downwardly and its inner arm upwardly, maintaining its corner 87 from engagement with the latch block 84. As previously mentioned, elevation of the rearward end of the clutch latch bar 72 also elevates the brake latch bar 88, by virtue of engagement of the former with the latter's pin 94, holding both latch bars in inoperative positions.

As disclosed in Fig. 1, the brake shoe 34 is applied to the drum 35 and the crankshaft 10 is at rest, no current is passing through the solenoid 68, and its plunger 69 occupies an elevated position, the rear portions of the clutch and brake latch bars 72, 88 being in their lower position for engagement with the respective corners 86, 92 of the latch block 84. When the stamping operation is to commence, current is caused to flow through the solenoid 68 and the driving clutch pulley 19 is rotated by a suitable driving motor (not shown) in a known manner, the current depressing the solenoid plunger 69 and moving the forward end of latch bar 72 downwardly to elevate its other end and also elevate the brake latch bar 88, freeing the corners 87, 91 from the block 84 and allowing the releasing spring 51 to swing the toggle mechanism in a direction to release the brake shoe 34 from the drum 35. The shipper lever 63 is then elevated to swing the associated clutch operating lever 28 in a clockwise direction (as seen in Fig. 1) and effect engagement of the clutch 20 in the manner above described.

Engagement of the clutch effects rotation of the crankshaft 10 and reciprocation of the crosshead 15 in its guides 16 to perform the stamping and forming operations on the tin can ends between the punches 17 and dies 18 of the press. During the rotation of the crankshaft, the eccentric 82 also rotates therewith, reciprocating the connecting rod 80 and rocking the lever 75 on its stud 76, which motion also reciprocates the clutch latch bar 72 across the lower arm 33 of the clutch operating lever 28. However, during such reciprocation of the latch bar 72, which is continuous so long as the crankshaft 10 is rotating, it can have no effect on the clutch operating lever 28 since its corner 87 is maintained elevated and out of position for engagement with the companion corner 86 on latch block 84 secured to the clutch operating lever arm 33. Such elevation also maintains the brake latch bar 88 in ineffective position.

In the event that the current to the solenoid 68 is disrupted, its plunger 69 is elevated, dropping the rearward portions of the clutch latch bar 72 and the brake latch bar 88 and allowing the corner 87 on the clutch latch bar 72 to engage the forward corner 86 on the block 84 and the corner 91 on the brake bar 88 to engage the block corner 92. Rearward movement of the clutch latch bar 72 is effected by rotation of the crankshaft 10, eccentric 82, connecting rod 80 and rocking lever 75, engaging the corner 87 with the corner 86 and swinging the clutch operating lever 28 in a counterclockwise direction (as seen in Fig. 1) to disengage the clutch 20. This same rearward motion of the latch bar 72 also engages the rear corner 92 of the latch block 84 with the brake latch bar corner 91, thereby coupling the brake latch bar 88 to the clutch operating lever arm 33 and carrying it in a rearward direction upon swinging of the clutch operating lever in a counterclockwise direction. In view of the connection 89 of the brake latch bar 88 with the lower lever 40 of the toggle lever mechanism, the toggle lever link 38 is moved upwardly to rock the brake shoe arm 36 on its pivot 32 and shift the brake shoe 34 into frictional engagement with the brake drum 35, thus stopping the crankshaft 10.

The counterclockwise motion of the clutch operating lever 28 is permitted in view of the clearance existing between the stop collar 59 and the trunnion block 57, as a result of movement of the parts to clutch engaging position upon depressing shipper lever 63.

By virtue of the mechanism described, it is possible to adjust the parts to insure stopping of the connecting rod 13 and crosshead 15 at top dead center, which is a preferred point. This stopping is assured at the selected point by the adjustability provided by the eccentric pin 78 connecting the rod 80 with the rocker arm 77 and also by virtue of the eccentric pin 41 connecting the toggle lever links 38, 40 together. It is apparent that these eccentric pins may be rotated in their mounting members to alter the relationship of the parts, and then clamped in the desired positions. The eccentric 82 provides a definite time relation between the position of the crankshaft 10 and the motion of the latch bar 72, and also of the engagement of the corner 87 in the latch bar 72 with the latch block 84 secured to the clutch operating lever 28, in effecting disengagement of the clutch 20. This same movement also applies the brake 34, 35 by virtue of engagement of the latch block corner 92 with the corner 91 of the brake bar 88.

As a result, assurance is had that the clutch 20 is released and the crankshaft 10 stopped at top dead center, at which point a minimum starting load will be imposed upon reengagement of the clutch 20 through elevation of the shipper lever 63. The friction clutch insures a comparatively gradual, as compared to an instantaneous, connection between the driving pulley 19 and the crankshaft 10, taking a load off the parts and also minimizing the shock to which the parts are subjected. In view of the top dead center position which the crankshaft 10 occupies when the clutch 20 is engaged, the initial rotation of the crankshaft in a direction to move the crosshead 15 downwardly is relatively small, the crosshead assuming its maximum velocity upon continued rotation of the crankshaft and prior to engagement of the punches 17 with the sheet metal and its cooperation with the dies 18 in performing the stamping out and forming operations.

Normally, the brake shoe 34 is engaging the drum 35 when the crankshaft 10 is at rest, as disclosed in Fig. 1. However, there are instances in which it is desired to release the brake to permit manual rotation of the crankshaft and of the parts by a workman in accomplishing adjusting and maintenance operations, under which conditions it is desired to rotate the crankshaft 10, as by inserting a rod (not shown) in one of the holes 95 of a collar 96 fixed to the end of the crankshaft 10.

In order to release the brake 34 manually, a control mechanism is provided, which includes a brake release arm 97 pivotally mounted on a post 98 secured to the machine frame 12, the arm having a lug 99 engageable with the underside 100 of the brake latch bar 88. The end of a drag link 101 is pivotally secured to the brake release arm 97 by a pin 102, this link being attached to the upper end of a brake release rod 103 extending slidably through the tubular shifter rod 56 to a position below its lower trunnion block 60, where it is clamped or otherwise secured to a rod head 104 connected to a bell crank 105 by a pin 106. The bell crank is pivotally mounted upon a stud 107 secured to a stationary machine part, the other end of the bell crank being secured to a brake release handle 108 pivotally mounted upon the frame stud 64 of the shipper lever 63 through the intermediary of a suitable link 109.

The brake release arm 97 is normally maintained in an inoperative position, with its lug 99 incapable of holding the brake latch bar 88 in elevated and brake releasing position, by a spring 110 received within a boss 111 forming an integral part of the bell crank 105 and resting upon a stationary part. It is apparent that the spring 110 tends to swing the bell crank 105 in a counterclockwise direction (as seen in Fig. 1), to move and hold the brake release rod 103 in an upward position and correspondingly swing the brake release arm 97 in a counterclockwise direction about its fulcrum post 98 to hold the lug 99 downwardly with respect to the brake latch bar 88. The extent of such ineffective positioning of the manual brake mechanism is determined by engagement of a set screw 112, secured to the bell crank 105, with a stationary part of the press, the set screw 112 being threaded through a lug 113 on the bell crank and held in adjusted position by a lock nut 114.

With the machine stationary, if it is desired to release the brake shoe 34, the brake release handle 108 is depressed to swing the bell crank 105 in a clockwise direction, which moves the brake release rod 103 downwardly and swings the brake release arm 97 in a clockwise direction, causing its lug 99 to shift the brake latch bar 88 upwardly and disengage its corner 91 from the corner 92 of the latch block 84. Upon such disengagement, the spring 51 is operative upon the toggle mechanism 38, 40 to move the brake shoe 34 from engagement with the drum 35, allowing the parts to be rotated.

Of course, release of the brake handle 108 causes the manual brake operating parts to reassume their initial ineffective positions under the influence of the spring 110.

As indicated, the parts are disposed in their stationary position in Fig. 1, with the clutch 20 disengaged and the crankshaft 10 occupying its top dead center position. The corners 87, 91 on the clutch and brake latch bars 72, 88 are in engagement with the latch block 84, which holds the brake 34 applied against the brake drum 35. Upon starting the mechanism through passage of current through the driving motor (not shown) and through the solenoid 68, the latch bar 72 is rocked in a counterclockwise direction, as shown in Fig. 1, to elevate its corner 87 from the latch block 84 and also to elevate the brake bar 88 from the latch block 84, which allows the spring 51 to release the brake. The shipper lever 65 is then elevated and the tubular shifter rod 56 moved downwardly to rock the clutch operating lever 28 in a clockwise direction and effect engagement of the clutch 20. The crankshaft 10 is then started from its top dead center position, which imposes the minimum starting load on the friction clutch 20. Whenever the press is to be stopped, the current to the solenoid 68 is discontinued, which causes the automatic release of the clutch 20 and application of the brake shoe 34 to the drum 35 at a predetermined point in the operating cycle, to insure that the press will be stopped at such predetermined point, which, in the present instance, is the top dead center of the crosshead 15.

As indicated, the press may be caused to stop at any other desired point through suitable adjustment of the various elements and their relationship with respect to one another.

It is, accordingly apparent that a clutch and brake mechanism for a stamping press has been provided, in which the clutch has a relatively long life through avoidance of subjecting its parts to high starting loads, and the press itself has a longer life, in view of the comparatively gradual acceleration of the crosshead 15 to its maximum velocity, instead of the instantaneous acceleration of the parts to their full operating speed and maximum velocity.

While one form of the invention has been illustrated and described in detail, it is to be understood that various changes may be made in its construction by those skilled in the art without departing from the spirit of the invention as defined in the appended claims.

Having thus described our invention, what we claim and desire to secure by Letters Patent is:

1. An apparatus of the character described, including a driven member, a driving member, a clutch for connecting said driving member with said driven member, a brake for stopping said driven member, means including an operating member for engaging and disengaging said clutch, control means operable by said driven member and connectable with said operating member for disengaging said clutch, means connectable with said operating member for applying said brake in response to movement of said operating member to clutch disengaging position, means engageable with said control means for moving it from connection with said operating member, and means for disconnecting said brake applying means from said operating member in response to movement of said control means from connection with said operating member.

2. An apparatus of the character described, including a driven member, a driving member, a clutch for connecting said driving member with said driven member, a brake for stopping said driven member, means including an operating lever for engaging and disengaging said clutch, a clutch latch bar connectable with said lever for disengaging said clutch, means operable by said driven member for reciprocating said clutch latch bar across said lever, a brake latch bar connectable with said lever for applying said brake in response to movement of said lever to clutch disengaging position, means engageable with said clutch latch bar for holding it from connection with said lever during its reciprocation, and cooperable means on said latch bars whereby said clutch latch bar holds said brake latch bar from connection with said lever.

3. A device of the character described comprising a rotatable driving member operable by an electric motor, a rotatable driven member, a clutch for engaging said members, a brake for arresting motion of the driven member, means for operating the brake including a resilient member urging the brake operating means to released position, means for operating the clutch, automatic means for operating and latching the clutch and brake, said automatic means comprising a clutch operating member operated by said driven member and movable to and from an operative position wherein it actuates said clutch operating means to disengage the clutch, means controlled and operated by said clutch operating member for actuating said brake operating means to set the brake, latch means for latching the clutch in disengaged position and the brake in set position when said clutch operating member is in operative position, and electrical means operable by the circuit of said motor to inactivate said clutch operating member during normal operation of the driven member and to activate the same when power to the motor is interrupted.

4. A device of the character described comprising a rotatable driving member operable by an electric motor, a rotatable driven member, a clutch for engaging said members, a brake for arresting motion of the driven member, means for operating the brake including a resilient member urging the brake operating means to released position, means for operating the clutch, automatic means for operating and latching the clutch and brake, said automatic means comprising a clutch operating member operated by said driven member and movable to and from an operative position wherein it actuates said clutch operating means to disengage the clutch, means controlled and operated by said clutch operating member for actuating said brake operating means to set the brake, latch means for latching the clutch in disengaged position and the brake in set position when said clutch operating member is in operative position, and a solenoid operable by the circuit of said motor to inactivate said clutch operating member during normal operation of the driven member and to activate the same when power to the motor is interrupted.

5. A device of the character described comprising a rotatable driving member, a rotatable driven member, a clutch for engaging said members, a brake for arresting motion of the driven member, a lever for operating the clutch, a lever for operating the brake, resilient means urging the brake to released position, an automatic control member mounted for oscillation along its longitudinal axis and for rocking movement about a transverse axis, means connecting the automatic member to the driven member to oscillate the former when the driven member is operating, means for rocking the automatic member to an inoperative position when power is supplied to the driving member and to an operative position when said power is interrupted, cooperable means on the automatic member and clutch lever for operating the latter to disengage the clutch and for latching the clutch is disengaged position, connecting means for interconnecting the brake lever and automatic member, and means for establishing an operative connection between said connecting means and automatic member to set the brake and to latch it in set position.

ED LAXO.
HAROLD D. FREDENBURGH.

REFERENCES CITED

The following references are of record in the file of this patent:

UNITED STATES PATENTS

| Number | Name | Date |
|---|---|---|
| 1,691,129 | Roulo | Nov. 13, 1928 |
| 1,826,289 | Shafer | Oct. 6, 1931 |
| 1,947,892 | Walsh | Feb. 20, 1934 |
| 2,024,293 | Keall | Dec. 17, 1935 |
| 2,130,139 | Knochl | Sept. 13, 1938 |
| 2,330,550 | Cameron | Sept. 28, 1948 |